US012602394B2

(12) United States Patent
Thunuguntla et al.

(10) Patent No.: US 12,602,394 B2
(45) Date of Patent: Apr. 14, 2026

(54) RESOURCE EFFICIENT FULL BOOTSTRAP

(71) Applicant: Intuit Inc., Mountain View, CA (US)

(72) Inventors: Saikiran Sri Thunuguntla, Bangalore (IN); Vishal Reddy Baddam, Bangalore (IN); Suman Ghosh, Bangalore (IN); Shweta Kisan Gawade, Pune (IN)

(73) Assignee: Intuit Inc., Mountain View, CA (US)

( * ) Notice: Subject to any disclaimer, the term of this patent is extended or adjusted under 35 U.S.C. 154(b) by 20 days.

(21) Appl. No.: 18/660,833

(22) Filed: May 10, 2024

(65) Prior Publication Data

US 2025/0348506 A1      Nov. 13, 2025

(51) Int. Cl.
    *G06F 16/25*        (2019.01)
    *G06F 9/44*         (2018.01)
    *G06F 16/28*        (2019.01)

(52) U.S. Cl.
    CPC .............. *G06F 16/254* (2019.01); *G06F 9/44* (2013.01); *G06F 16/285* (2019.01)

(58) Field of Classification Search
    CPC ......... G06F 16/254; G06F 9/44; G06F 16/285
    See application file for complete search history.

(56) References Cited

U.S. PATENT DOCUMENTS

| | | | |
|---|---|---|---|
| 8,818,971 B1 | 8/2014 | Fontoura et al. | |
| 2014/0330780 A1 | 11/2014 | Chen et al. | |
| 2017/0206232 A1* | 7/2017 | Dean ..................... | G06F 9/4881 |
| 2017/0220944 A1* | 8/2017 | Nghiem ................ | G06F 9/5066 |
| 2018/0203744 A1* | 7/2018 | Wiesmaier ............. | G06F 9/505 |
| 2019/0138345 A1* | 5/2019 | Singh ..................... | G06F 16/211 |
| 2020/0026710 A1* | 1/2020 | Przada ................... | G06N 20/00 |
| 2020/0126010 A1* | 4/2020 | Gundavelli ........ | G06Q 10/0637 |
| 2023/0004538 A1* | 1/2023 | Kumar ................... | G06F 16/214 |
| 2023/0394013 A1 | 12/2023 | Hekimian-Williams et al. | |
| 2024/0184784 A1 | 6/2024 | Xie et al. | |

* cited by examiner

*Primary Examiner* — Etienne P Leroux
*Assistant Examiner* — Oscar Wehovz
(74) *Attorney, Agent, or Firm* — Paradice & Li LLP

(57)        ABSTRACT

Systems and methods are disclosed for a resource efficient full bootstrap of a destination database. Instead of executing, e.g., a single Apache Spark™ job that may encounter errors and require restarting the entire job and reallocation of Spark cluster resources, the data pulls from a data source for a full bootstrap may be divided into smaller jobs. Dividing the set of data pulls into smaller jobs (which may be kept as a simpler Java™ program as compared to an Apache Spark job) allows only the impacted job to again be executed if an error occurs during execution of that job. In addition, resources to execute the job for bootstrapping a database may be allocated only once, which may allow the resources to be less than if estimated and grown based on errors and multiple attempts to execute the job (such as for an Apache Spark job to bootstrap the database).

20 Claims, 7 Drawing Sheets

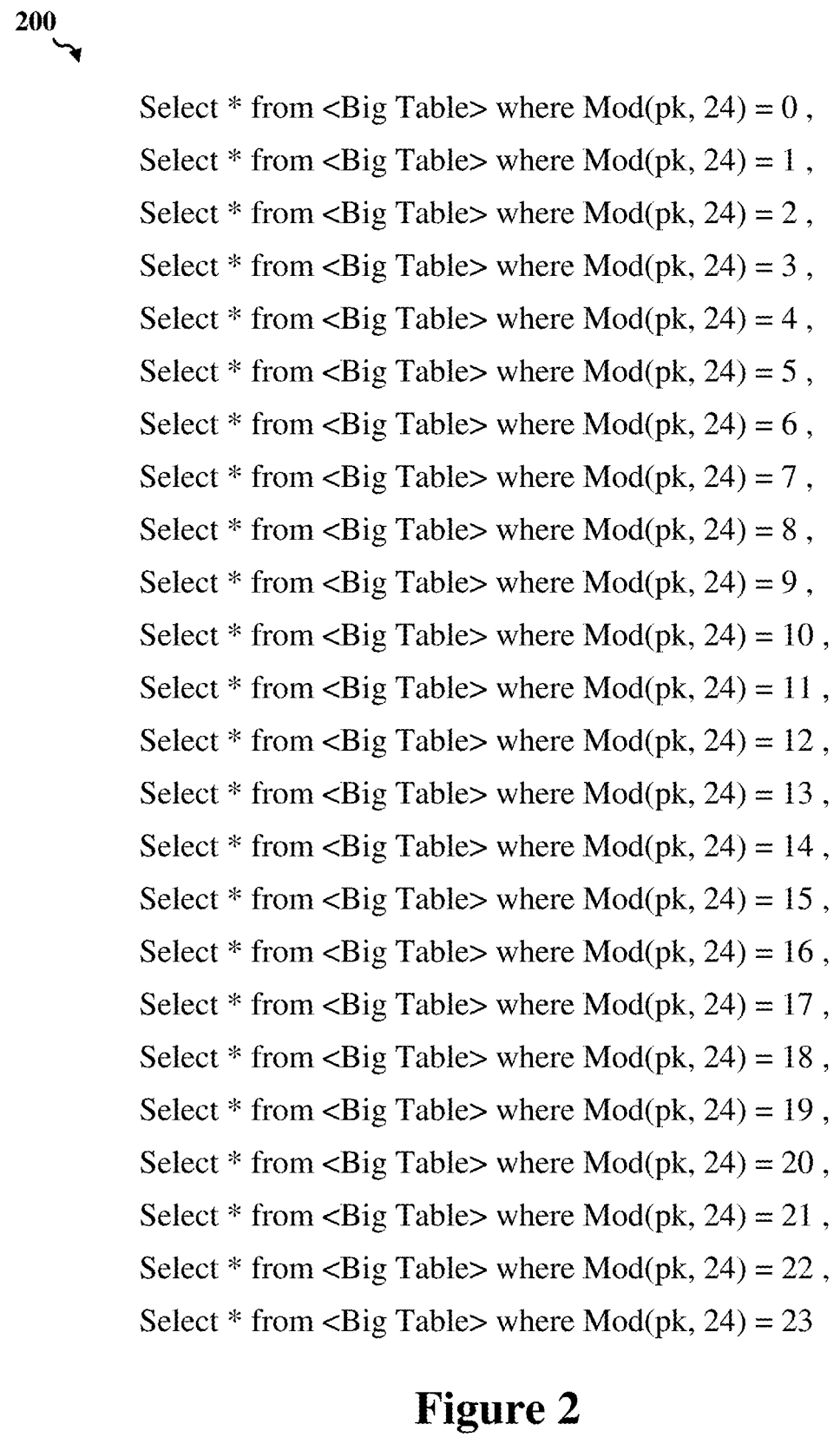

200

Select * from <Big Table> where Mod(pk, 24) = 0 ,

Select * from <Big Table> where Mod(pk, 24) = 1 ,

Select * from <Big Table> where Mod(pk, 24) = 2 ,

Select * from <Big Table> where Mod(pk, 24) = 3 ,

Select * from <Big Table> where Mod(pk, 24) = 4 ,

Select * from <Big Table> where Mod(pk, 24) = 5 ,

Select * from <Big Table> where Mod(pk, 24) = 6 ,

Select * from <Big Table> where Mod(pk, 24) = 7 ,

Select * from <Big Table> where Mod(pk, 24) = 8 ,

Select * from <Big Table> where Mod(pk, 24) = 9 ,

Select * from <Big Table> where Mod(pk, 24) = 10 ,

Select * from <Big Table> where Mod(pk, 24) = 11 ,

Select * from <Big Table> where Mod(pk, 24) = 12 ,

Select * from <Big Table> where Mod(pk, 24) = 13 ,

Select * from <Big Table> where Mod(pk, 24) = 14 ,

Select * from <Big Table> where Mod(pk, 24) = 15 ,

Select * from <Big Table> where Mod(pk, 24) = 16 ,

Select * from <Big Table> where Mod(pk, 24) = 17 ,

Select * from <Big Table> where Mod(pk, 24) = 18 ,

Select * from <Big Table> where Mod(pk, 24) = 19 ,

Select * from <Big Table> where Mod(pk, 24) = 20 ,

Select * from <Big Table> where Mod(pk, 24) = 21 ,

Select * from <Big Table> where Mod(pk, 24) = 22 ,

Select * from <Big Table> where Mod(pk, 24) = 23

Figure 2

700

Receive an initial data collection task of a software platform to retrieve data from one or more source databases. 702

The initial data collection task includes a plurality of identifiers to identify the data to be collected from the one or more source databases. 704

Divide the initial data collection task into a plurality of intermediate data collection tasks. 706

Divide the data into a plurality of subsets of data based on the plurality of identifiers. 708

Each intermediate data collection task instructs pulling a subset of the plurality of subsets of data from the one or more source databases. 710

Execute each intermediate data collection task from the plurality of intermediate data collection tasks. 712

Pull the subset of data associated with the intermediate data collection task from the one or more source databases. 714

Write the subset of data to an intermediate data file associated with the intermediate data collection task. 716

Generate an indication that pulling is complete after writing the subset of data to the intermediate data file. 718

Writing the data from the plurality of intermediate data files to a destination database. 720

Figure 7

RESOURCE EFFICIENT FULL BOOTSTRAP

TECHNICAL FIELD

This disclosure relates generally to the bootstrapping of databases, including a resource efficient yet scalable full bootstrap of one or more databases.

DESCRIPTION OF RELATED ART

Databases are used to store and manage data for various activities. For example, an online transaction processing (OLTP) database manages data from online transactions (such pages accessed by users accessing a website or online platform, interactions with the platform, and so on). An online analytical processing (OLAP) database manages data collected for such online transactions (such as information regarding the users accessing the website or online platform, including number of unique visitors, peak number of visitors, and so on). Databases are organized by index tables pointing to storage locations storing specific data. With one or more index tables indexing the stored data, data to be used may be accessed from the database by searching the index tables for the specific data to be obtained, identifying the storage location of the data from the index table, and accessing the storage location in the database. Data may be read from and written to the database, with the index tables being updated to indicate changes to the database (such as including a changelog and updating the affected entries in the index tables).

When a database is to be first initialized or is to be reconstructed, the data to be managed by the database is to be written into storage of the database, and the index tables to index the stored data are to be generated. Loading the data into the database and otherwise initializing the database may be referred to as "bootstrapping." When a database is initialized in order to be active for the first time or to be fully reconstructed (such as when data types change in the data sources), all of the data to be stored by the database is to be loaded into the database and the database initialized, which may be referred to as a "full bootstrap."

SUMMARY

Systems and methods are disclosed for a resource efficient full bootstrap of one or more databases. To expedite the bootstrapping process, the data pulls of the data to be written to the database may be divided and executed in a concurrent manner. In using a single Apache Spark™ job to pull all of the data for writing during a full bootstrap, the Apache Spark job requires a full new execution of the job if any errors occur during the job. In contrast, dividing the pulls into smaller jobs (which may be kept as a simpler Java™ program as compared to an Apache Spark job) allows only the impacted job to again be executed if an error occurs during execution of that job. In addition, resources to execute the job for bootstrapping a database may be allocated only once, which may allow the resources to be less than if estimated and grown based on errors and multiple attempts to execute the job (such as for an Apache Spark job to bootstrap the database).

One innovative aspect of the subject matter described in this disclosure can be implemented as a computer-implemented method for bootstrapping a destination database. The method includes receiving an initial data collection task of a software platform to retrieve data from one or more source databases. The initial data collection task includes a plurality of identifiers to identify the data to be collected from the one or more source databases. The method also includes dividing the initial data collection task into a plurality of intermediate data collection tasks, which includes dividing the data into a plurality of subsets of data based on the plurality of identifiers. Each intermediate data collection task instructs pulling a subset of the plurality of subsets of data from the one or more source databases. The method further includes executing each intermediate data collection task from the plurality of intermediate data collection tasks. The execution of each intermediate data collection task includes: pulling the subset of data associated with the intermediate data collection task from the one or more source databases; writing the subset of data to an intermediate data file associated with the intermediate data collection task; and generating an indication that pulling is complete after writing the subset of data to the intermediate data file. The method also includes, after writing all of the data to the plurality of intermediate data files for the plurality of intermediate data collection tasks, writing the data from the plurality of intermediate data files to a destination database.

Another innovative aspect of the subject matter described in this disclosure can be implemented in a system for bootstrapping a destination database. An example system includes one or more processors and a memory storing instructions that, when executed by the one or more processors, cause the system to perform operations. The operations include receiving an initial data collection task of a software platform to retrieve data from one or more source databases. The initial data collection task includes a plurality of identifiers to identify the data to be collected from the one or more source databases. The operations also include dividing the initial data collection task into a plurality of intermediate data collection tasks, which includes dividing the data into a plurality of subsets of data based on the plurality of identifiers. Each intermediate data collection task instructs pulling a subset of the plurality of subsets of data from the one or more source databases. The operations further include executing each intermediate data collection task from the plurality of intermediate data collection tasks. The execution of each intermediate data collection task includes: pulling the subset of data associated with the intermediate data collection task from the one or more source databases; writing the subset of data to an intermediate data file associated with the intermediate data collection task; and generating an indication that pulling is complete after writing the subset of data to the intermediate data file. The operations also include, after writing all of the data to the plurality of intermediate data files for the plurality of intermediate data collection tasks, writing the data from the plurality of intermediate data files to a destination database.

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2 shows a list of example structured query language (SQL) queries for dividing primary keys into groups for data collection, according to some implementations.

FIG. 7 shows an illustrative flow chart of an example operation of bootstrapping a destination database, according to some implementations.

Like numbers reference like elements throughout the drawings and specification.

DETAILED DESCRIPTION

Figure 1:
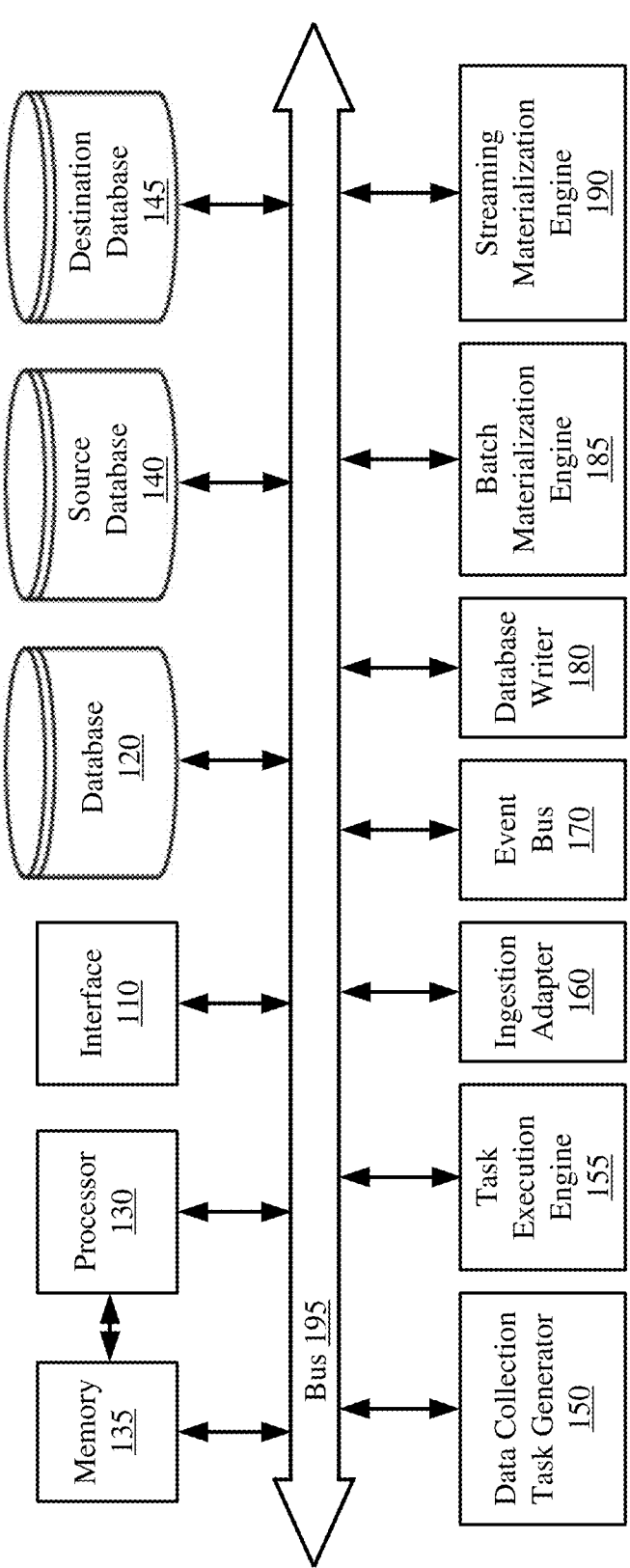
FIG. 1 shows an example system for bootstrapping a destination database, according to some implementations.

Implementations of the subject matter described in this disclosure may be used for the bootstrapping of databases, including a resource efficient full bootstrap of one or more destination databases.

When a full bootstrap of a database is performed (such as when the database is first initialized or the database is to be reconstructed), the data to be managed by the database is pulled from other databases and written to the storage of the database. Index tables indexing the stored data are also generated in order to manage the data (such as for reading from and writing to the database or for performing other queries on the data). For a full bootstrap, a single job is created from a software platform indicating the data to be pulled and stored on the database. For example, the job may indicate specific databases, specific database locations, specific data (which may be looked up in a database table to identify its location), shards, or other units of data that are to be copied and transferred to the database being initialized. Traditionally, the single job is executed as a single process. For example, the single job in many instances is a job from the Apache Spark™ (Spark) engine. The Spark engine, as a distributed processing system, allocates resources from the system to execute the job, and the resources execute the job to completion.

One problem with the single job approach for performing a full bootstrap is that any errors in execution of the job cause the entire job to be executed again. As a result, any data that was successfully pulled is removed, and the entire process begins anew. As such, completion of the job is an all or nothing proposition that could cause lengthy delays if any errors are encountered during the job execution. The delays and problems also exponentially increase as the amount of data to be pulled increases (since the number of actions to be executed for the job increase).

A further problem with the single job approach is that many of the data pulls for the job are performed sequentially.

The amount of time performing the job corresponds to the number of data pulls that are sequential. In combination with the error issues for a single job noted above, sequentially performing data pulls exacerbates the delays and problems in performing the single job to perform a full bootstrap.

Another problem with the single job approach, and especially with a Spark job, is that the resource assignment by the Spark engine may become unmanageable for a large job. For example, if an error occurs in executing the Spark job, the Spark engine may increase the resources allocated to performing the job. If errors repeatedly occur, the amount of resources continues to scale until the Spark engine may no longer be able to effectively operate or may otherwise impact other operations performed by the Spark engine because of a restriction in available resources. Such increases in resource allocation are not an efficient allocation of resources since an increasing number of resources are tied up for an increasing amount of time as the single job is executed multiple times.

As such, there is a need for a time and resource efficient full bootstrap that addresses the problems noted above.

As described herein, alternative to processing a single job for a full bootstrap, a system is configured to divide the single job into a plurality of intermediate jobs. In particular, the job for full bootstrapping a destination database includes an initial data collection task that indicates the data to be retrieved from one or more source databases. The system is configured to divide the initial data collection task into a plurality of intermediate data collection tasks. Generating the intermediate data collection tasks is based on dividing the data to be pulled into a plurality of subsets of data based on a data identifier having a high cardinality (such as a primary key of the data or a column value of data identified in a data table, with the column having a high cardinality). As such, the system is able to execute the intermediate data collection tasks independently (which can include concurrently pulling data for a plurality of intermediate data collection tasks). In this manner, if an error occurs in one of the intermediate data collection tasks, the system is able to again execute that intermediate data collection task without impacting the other data collection tasks (thus not requiring the entire job to be again executed). In addition, alternative to having a single Spark job that requires the estimating and dynamic allocation of resources to perform the job (which may grow as a result of errors during the data pulls), the intermediate data collection tasks may be formatted as one or more basic Java™ programs (including Java Database Connectivity™ (JDBC) pull operations) that can use static resources, even if an error is encountered during data pulls. As such, resource allocation for a Spark job can occur once (thus not requiring reallocation through the data pull process), with scaling of resources limited to the remaining tasks of the Spark job after the data pulls (such as writing the data to the destination database), which are less likely to encounter errors than the data retrieval tasks.

Various implementations of the subject matter disclosed herein provide one or more technical solutions to networking and databases. As such, various aspects of the present disclosure provide a unique computing solution to a unique computing problem that did not exist prior to the use of databases and computer networks. In addition, the required reading and writing of electronic data in a specific manner between databases cannot be performed in the human mind, much less practically in the human mind, even if pen and paper are used.

FIG. 1 shows an example system 100 for bootstrapping a destination database, according to some implementations.

Figure 5:
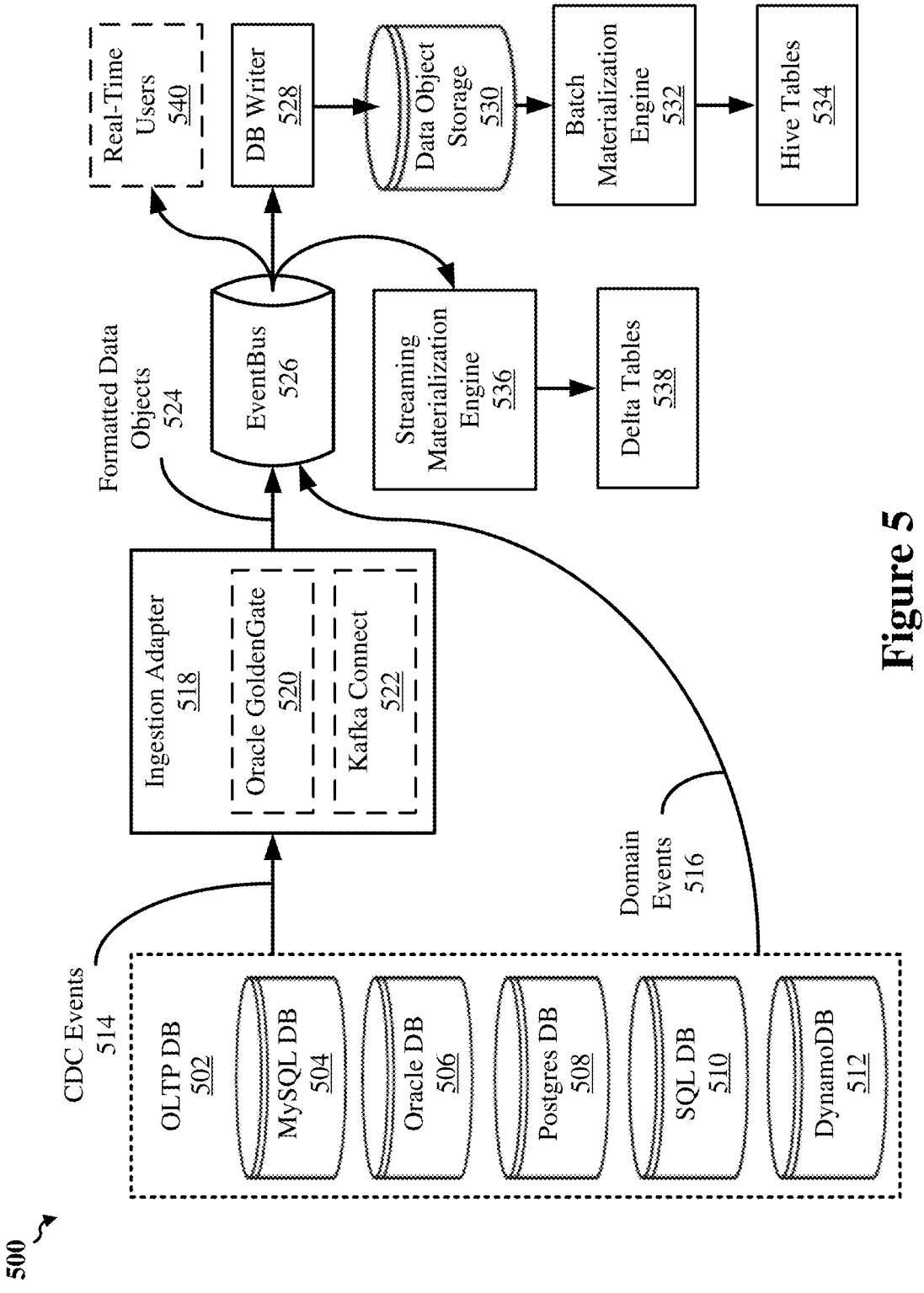
FIG. 5 shows an example unified ingestion platform (UIP) for one or more online transaction processing (OLTP) databases and one or more online analytical processing (OLAP) databases, according to some implementations.

The system 100 includes an interface 110, a database 120, a processor 130, a memory 135 coupled to the processor 130, a source database 140, a destination database 145, a data collection task generator 150, a task execution engine 155, an ingestion adapter 160, an event bus 170, a database writer 180, a batch materialization engine 185, and a streaming materialization engine 190. In some implementations, the various components of the system 100 may be interconnected by at least a data bus 195, as depicted in the example of FIG. 1. In other implementations, the various components of the system 100 may be interconnected using other suitable signal routing resources. The components of the system 100 may be across one or more computing devices. For example, the system 100 may be implemented in a distributed computing environment, such as using the Amazon® Web Services (AWS) platform, as depicted in FIG. 5.

The interface 110 may be one or more input/output (I/O) interfaces to receive the single job to bootstrap a destination database 145 from a software platform (such as from another device instructing the bootstrapping of a new database). Alternatively, the job may be received from the system 100 itself (such as from a software platform executed by the processor 130). The interface 110 may also obtain data from the source database 140 during data retrieval or may also receive or provide inputs or outputs for continued operation of the system 100. An example interface 110 may include a wired interface or wireless interface to a network to communicably couple with other devices. The interface may also include input/output (I/O) peripherals for communicating with a local user, such as a display, mouse, keyboard, speakers, microphone, and so on.

The database 120 may store the job received by the system 100 (such as by the interface 110 or generated by a software platform executed by the system 100), the intermediate data collection tasks generated from the job, a record of which intermediate data collection tasks have been completed, data retrieved from the source database 140 for bootstrapping the destination database 145, the tables indexing the data stored in the source database 140 or to be stored in the destination database, or other computer executable instructions or data for operation of the system 100. In some implementations, the database 120 may include a relational database capable of presenting information (such as the retrieved data to be written to the destination database) as data sets capable of being manipulated using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 530 may be capable of executing one or more applications (such as a software platform), the data collection task generator 150, the task execution engine 155, the ingestion adapter 160, the event bus 170, the database writer 180, the batch materialization engine 185, and the streaming materialization engine 190. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration in one device or distributed across a plurality of devices).

The memory 135, which may be a persistent memory (such as non-volatile memory or non-transitory memory), may store any number of software programs, executable instructions, machine code, algorithms, and the like that can be executed by the processor 130 to perform one or more corresponding operations or functions. For example, the memory 135 may store one or more applications, the data collection task generator 150, the task execution engine 155, the ingestion adapter 160, the event bus 170, the database writer 180, the batch materialization engine 185, and the streaming materialization engine 190 that may be executed by the processor 130. The memory 135 may also store inputs, outputs, or other information associated with the components 150-190 of the system 100 or any other data for operation of the system 100. In some implementations, hardwired circuitry may be used in place of, or in combination with, software instructions to implement aspects of the disclosure.

The source database 140 includes one or more databases from which data to be managed by the destination database 145 is to be pulled during bootstrapping of the destination database 145. In some implementations, the source database 140 includes one or more online transaction processing (OLTP) databases, such as for web services or other offerings that may be provided to one or more users. The destination database 145 includes one or more databases to be initialized or reconstructed and to manage the data pulled from the source database 140. To note, the destination database 145 may be a data lake or include any number of storage and management components. In some implementations, the destination database 145 includes one or more online analytical processing (OLAP) databases. In this manner, the OLAP databases may be used to process the data from the OLTP databases to provide analysis or insights regarding the data stored on the OLTP databases without impacting operation of the OLTP databases. In this manner, the OLTP database can continue to assist in providing services to users without impact.

Each of the source database 140 and the destination database 145 store and manage data objects, which may be organized as rows in one or more data tables (which may also be referred to as tables). The data objects are indexed by one or more index tables that identify and are used to manage the data objects in the database. The index tables (which may also be referred to as indexes) include rows of database objects to identify the storage locations of data objects in the database. As used herein, a "data object" refers to a piece of data stored or to be stored in a database (such as in a data table), and a "database object" refers to an index table component (such as a row entry) in an index table that indexes the data objects, with the database object identifying a specific data object stored in the database.

The system 100 is configured to process the single job for bootstrapping the destination database 145 by generating and processing smaller, intermediate data collection tasks that identify subsets of the data to be collected (instead of processing the initial, large data collection task that identifies all of the data to be collected) in order to collect all of the data to be written to the destination database 145. After collection, the system 100 may reconcile and merge all of the collected data and write the data to the destination database 145. In executing intermediate data collection tasks, the system 100 can collect the data in a piecewise manner. If an intermediate data collection task fails (such as due to an error generated during execution of the task), the system 100 may execute only the intermediate task that failed instead of the initial data collection task that would require retrieving all of the data again. The data collection task generator 150 divides the initial data collection task into a plurality of intermediate data collection tasks, and the task execution engine 155 executes the intermediate data collection tasks generated by the data collection task generator 150.

Referring to the data collection task generator 150, the generator 150 divides the initial data collection task into a plurality of intermediate data collection tasks. To divide the initial data collection task (such as included in a single Spark job), the data collection task generator 150 divides the data to be retrieved from the source database 140 into a plurality of subsets of data. Each intermediate data collection task identifies a unique subset of data to be retrieved. To divide the data into subset of data, the initial data collection task identifies all of the data to be collected for writing to the destination database 145 based on a plurality of identifiers that identify the data to be collected from the source database 140. For example, the initial data collection task may include a list of identifiers or a range of identifiers identifying the data objects to be retrieved for writing to the destination database 145. The initial data collection task including identifiers may also refer to the initial data collection task identifying the data sources, with all identifiers in the data sources being used to identify the data objects to be retrieved.

In some implementations, the identifiers are primary keys of the data objects to be collected. Each data object in a source database 140 is associated with a unique primary key identifying that data object. Each primary key is stored in an index table indexing the data stored in the source database 140. For example, a structured query language (SQL) table that indexes the data stored in a database may include a column titled "PRIMARY KEY," with each row of the SQL table corresponding to a data object stored in the database (such as in one or more data tables). Each index table cell of the column PRIMARY KEY includes a unique entry that identifies the data object associated with the index table row. As such, the data collection task generator 150 divides the data to be collected into subsets of data to be collected based on the primary keys of the data. In some implementations, each intermediate data collection task includes a list of primary keys corresponding to the data to be collected for the intermediate data collection task. The data collection task generator 150 may apply a mathematical operator on the primary keys (such as a modulo function described below) to generate the list.

For example, the system 100 receives the primary keys of the data to be collected from the initial data collection task (such as from the initial Spark job). The data collection task generator 150 applies the mathematical operator to each primary key to identify to which intermediate data collection task the corresponding data object is to be included. In some implementations, the mathematical operator is a modulo function. The data collection task generator 150 is configured to divide the data into a determined number of subsets of data. In the use of the modulo function, a parameter of the modulo function is the divisor, with the output of the modulo function being the remainder of dividing the primary key by the divisor. The data collection task generator 150 groups the primary keys corresponding to the same modulo function output (i.e., the same remainder) as corresponding to a subset of data for an intermediate data collection task. For example, if the data collection task generator 150 is to divide the data into ten subsets of the data, the parameter is set to 10. As such, primary keys corresponding to a remainder of 0 are grouped into a first intermediate data collection task, primary keys corresponding to a remainder of 1 are grouped into a second intermediate data collection task, and so on up to a remainder of 9 such that the ten groups of primary keys identifying the ten subsets of data to be retrieved are generated for the ten intermediate data collection tasks generated by the data collection task generator 150. To note, the parameter may be fixed (such as being configured during coding of the data collection task generator 150) or may be an adjustable parameter that may be input to the system 100 (such as by a user or another device or component).

To note, the initial data collection task may indicate only the specific data sources or data locations within the data sources of data to be collected and written to the destination database 145 during the bootstrap process. In some implementations, the data collection task generator 150 may perform an index scan on the index table for the source database 140 to identify each primary key to be used (such as from the PRIMARY KEY column of the SQL table indexing the data). In addition, if the index table is in SQL format, SQL queries may be executed in order to process the primary keys in the index table to group the primary keys (such as based on a modulo function). To note, while one index table is described as being used with reference to the examples herein, any number of index tables (as well as any number of data sources) may be used.

FIG. 2 shows a list of example SQL queries 200 for dividing primary keys into groups for data collection. In the example, a table of grouped primary keys is labeled as "Big Table," the primary keys are labeled as "pk," and the * indicates the group in the Big Table selected based on the modulo function "Modo" being applied to the primary key. To note, the divisor in the example is 24, thus dividing the primary keys into 24 groups. In some implementations, the system 100 is configured to divide the identifiers into 24-48 groups, as desired for the application. However, any plurality of groups may be generated based on any suitable divisor parameter of the Mod function.

The data collection task generator 150 may apply the SQL queries 200 to the primary keys in the index table (such as the SQL table including the PRIMARY KEY COLUMN) in order to group the primary keys into 24 groups for 24 intermediate data collection tasks. In this manner, the primary keys associated with the Mod function output of a remainder of 0 are associated with a first group and thus a first intermediate data collection task, the primary keys associated with the Mod function output of a remainder of 1 are associated with a second group and thus a second intermediate data collection task, and so on up to the primary keys associated with the Mod function output of a remainder of 23 are associated with a 24th group and thus a 24th intermediate data collection task. In this manner, the Big Table stores 24 lists of primary keys for a source database.

With the primary keys divided into a defined number of groups (such as listed in the Big Table), the data collection task generator 150 generates the intermediate data collection tasks, with each intermediate data collection task including a unique group of primary keys (and thus being associated with the subset of data to be collected corresponding to the group of primary keys). In some implementations, alternative to listing the primary keys in the Big Table, the Big Table may list the data table locations associated with the primary keys of a group. For example, when performing the SQL queries 200 on a primary key to identify to which group the primary key (and thus the associated data object)

belongs, the data collection task generator 150 may perform a data table scan to identify the data table locations corresponding to the primary keys and write the data table locations to the corresponding group in the Big Table. In this manner, each group includes a plurality of data table locations of data objects to be pulled for an intermediate data collection task. Otherwise, if the Big Table lists groups of primary keys, the task execution engine 155 may cause a data table scan during execution of an intermediate data collection task to find data table locations of data objects corresponding to the primary keys in order to collect the data objects.

In some implementations, the intermediate data collection task is included in a Java™ program that may use the JDBC™ type application programming interface (API) to access the source database 140. In this manner, the task execution engine 155 executes the Java program in order to perform a data table scan to identify the data table locations of data objects to be collected and execute the JDBC pull operations for those data table locations to collect the data corresponding to the group of primary keys from the one or more data tables of the source database 140. For example, if the intermediate data collection task includes a plurality of primary keys, the Java program may cause a data table scan to identify each data table location to be accessed and data object to be retrieved based on the primary keys listed in the intermediate data collection task. Then, the Java program may cause insertion of each data table location into a parameter of a JDBC pull operation and instruct the operation to be performed via the JDBC API such that the source database 140 provides the data object. With the data object received, the intermediate data collection task (the Java program) may cause the data object to be written to an intermediate data file for the intermediate data collection task.

To note, if primary keys are used as the identifiers of the data to be pulled in order to divide the data into subsets of data, the system 100 performs an index scan in order to generate the intermediate data collection tasks and then performs a data table scan in order to execute the intermediate data collection tasks. As such, the system 100 interfaces with the source database 140 two different times to access and scan two different sets of tables (index tables and data tables) in order to generate and execute the intermediate data collection tasks.

Alternative to the use of primary keys as identifiers of the data to be collected, the identifier may be a data object component included in the data tables, with the column including the data object components across the data objects having a high cardinality (such as having greater than a threshold number of unique values). A high cardinality column is to be used to ensure that not too many data objects have the same identifier (which could cause unbalanced division of data into the subsets for the intermediate data collection tasks). To note, one or more columns of the data table may have a high cardinality such that less than a threshold number of data objects may have a same column value. If a high cardinality column's values from one or more data tables of the source database 140 is used as the identifier for generating the intermediate data collection tasks, the system 100 may not be required to perform index scans of the index tables of the source database 140 (such as described above with reference to using primary keys as the identifiers). In this manner, operations to generate the intermediate data collection tasks and execute the data collection tasks may be limited to data table scans of the source database 140, which may reduce the complexity of generating and executing the intermediate data collection tasks by the system 100. To note, though, since a high cardinality column is to be used, the column (or columns) of the data table to be used to include the identifiers is predefined before generation of the intermediate data collection tasks (such as during programming of the data collection task generator 150) because which column has a high cardinality may depend on the type of data stored or the database application. As such, a priori knowledge of the data tables may be used to manually identify in the data collection task generator 150 as to which column (or columns) has a high cardinality and is to be used for the identifiers.

If the cell values of the high cardinality column are numbers, the system 100 may apply the mathematical operator directly to the cell values to divide the data into subsets of data for collection. For example, if the data table is an SQL table, the data collection task generator 150 may execute the SQL queries 200 depicted in FIG. 2, except with the "pk" depicted in the SQL queries 200 being replaced with the identifier name (such as the cell name) of the data table's high cardinality column. The queries may also be modified to write the data table location into the corresponding list in the Big Table (instead of a primary key). In this manner, the Big Table includes 24 subsets of data table locations of the data objects to be collected, thus dividing the data objects into 24 subsets of data objects. As such, the Big Table may include 24 lists of data table locations, with each list of data table locations being included in an intermediate data collection task (such as a Java™ program as described herein) by the data collection task generator 150. In executing the intermediate data collection task, each listed data table location may be inserted as a parameter into a JDBC™ pull operation such that the corresponding data objects are collected from the source database 140, and the data objects are written into an intermediate data file for the intermediate data collection task.

In some implementations, the data table column of high cardinality to be used for the identifiers may not strictly include numerical values (e.g., cell values may include text or other values). Additionally or alternatively, a combination of more than one column of the data table may be used to include an identifier. In such implementations, the data collection task generator 150 may apply a hash function to the one or more columns to generate a numerical hash for each of the data objects in the data table. In this manner, the data collection task generator 150 may apply the modulo function (or other suitable mathematical operator) to each hash in order to generate the groups of identifiers and thus the intermediate data collection tasks. To note, any suitable hash function may be used that results in the resulting corpus of identifiers having a high cardinality (such as less than a threshold number of identifiers having the same value).

In generating each intermediate data collection task, the data collection task generator 150 generates JDBC™ pull operations (such as a JDBC script) that are included in the Java program. As noted above, the parameter of the data table location to be pulled for a JDBC pull operation may be determined based on a scan for a primary key or may have been identified during a previous data table scan for identifiers in a high cardinality column, and the Java program causes the insertion of such data table locations into the JDBC pull operations. In this manner, when the Java program is executed, the subset of data objects corresponding to the data table locations is collected from the source database 140.

Referring back to FIG. 1, the task execution engine 155 instructs the execution of each of the intermediate data collection tasks in order to collect the different subsets of data. For example, if each intermediate data collection task is a Java™ program including a plurality of JDBC™ pull operations for collecting a subset of data from the source database 140, the task execution engine 155 may cause the execution of the intermediate data collection task and instruct the JDBC pull operations to be performed. To note, the pull operations of an intermediate data collection task may be performed sequentially or concurrently. For example, a Java program may be written such that multiple processing threads may be executed and perform the pull operations in parallel to expedite the collection of the data for the intermediate data collection task. In addition to the data pulls of an intermediate data collection task potentially being executed concurrently, multiple intermediate data collection tasks may be executed concurrently. For example, different processing cores may be used to execute intermediate data collection tasks in parallel.

Figure 3:
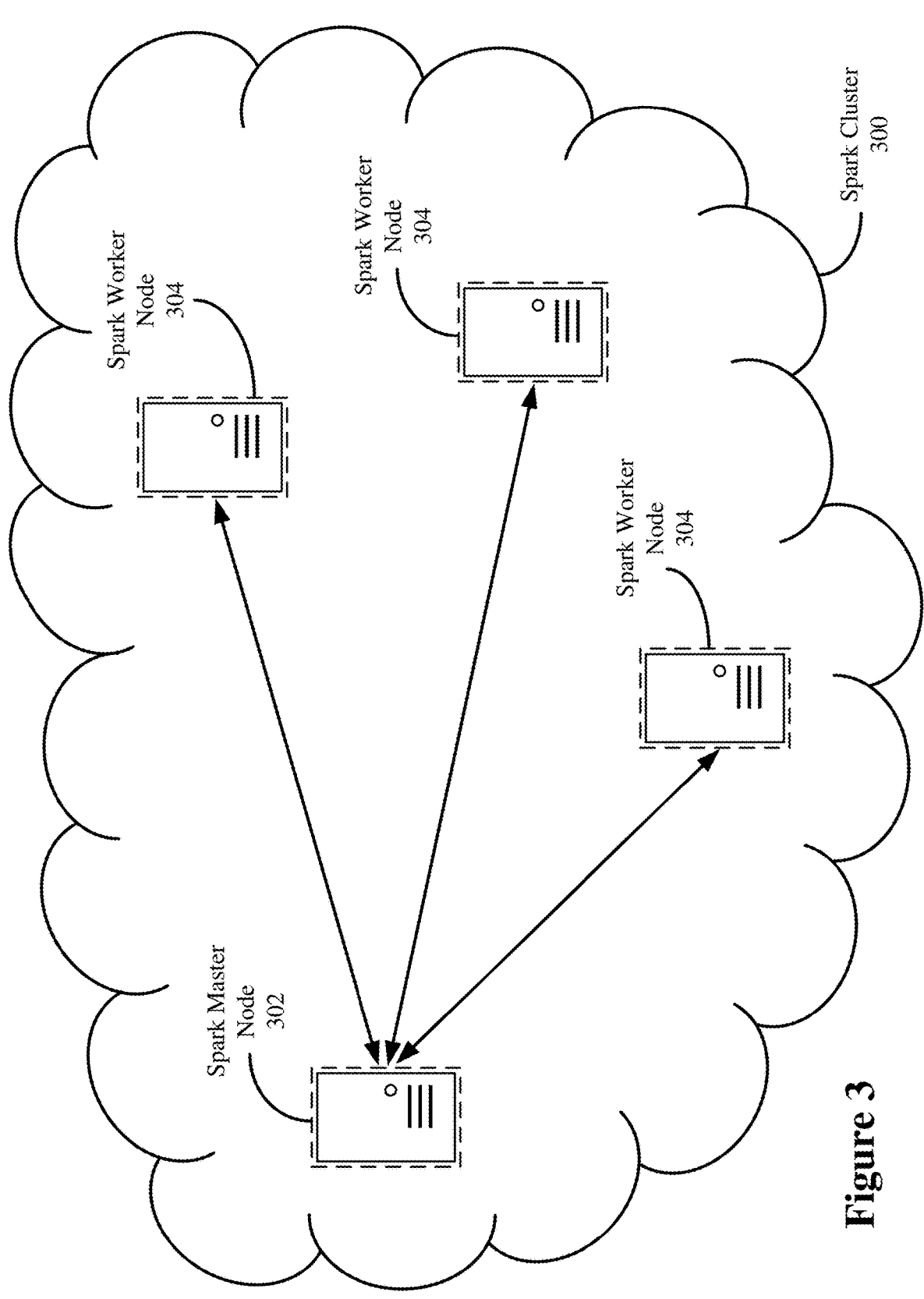
FIG. 3 shows an example Apache Spark™ cluster that typically executes the Apache Spark job for a full bootstrap.

If the initial data collection task is in a single, initial Spark job for fully bootstrapping the destination database 145 and the intermediate data collection tasks are one or more Java™ programs, the one or more Java programs may be executed in a single node of the Spark cluster that would typically execute the Spark job. FIG. 3 shows an example Apache Spark™ cluster 300 that typically executes the Apache Spark job for a full bootstrap. The Spark cluster 300 may be included in the resources of the system 100. The Spark cluster 300 includes a Spark master node 302 and a plurality of Spark worker nodes 304. The Spark master node 302 may provide some processing while also managing the work performed by the Spark worker nodes 304. For example, the Spark master node 302 delegates tasks from the Spark job to each of the Spark worker nodes 304 and manages the results from each of the Spark worker nodes 304. To note, three Spark worker nodes 304 are depicted for clarity in FIG. 3, but a Spark cluster may include any suitable number of worker nodes.

If the system 100 generates the Spark job and uses a Spark driver to cause execution of the job, the Spark driver is used to estimate the resources required to execute the Spark job, and the Spark driver is used to allocate the Spark cluster 300 based on the estimation to execute the Spark job. As noted above, if an error occurs during execution of the Spark job, the resources of the cluster 300 may be increased in a next attempt to execute the Spark job. Since data pulls from one or more sources may result in errors, the resources may iteratively increase to attempt to complete the Spark job. As a result, more resources than may be required may be allocated for executing the Spark job.

If the data pulls are distributed across a plurality of intermediate data collection tasks, with the intermediate data collection tasks being a simpler Java™ program instead of a Spark job, execution of the Java program does not require the entire Spark cluster 300. In some implementations, the Java program is executed at the Spark master node 302, thus not requiring delegation to one or more Spark worker nodes 304. In this manner, if execution of one of the intermediate data collection tasks results in an error, the Spark master node 302 does not need to redelegate resources or have the cluster resources increased to execute the intermediate data collection task. Instead, the Spark master node 302 may re-attempt to execute the task (and thus does not impact execution of the other intermediate data collection tasks).

As such, estimation of the required resources and scaling of the resources for the Spark cluster 300 are not critical for execution of the data pulls are not necessary. In some implementations, a basic cluster may be initially defined for the Spark job without focusing on estimating the required resources needed (such as including one Spark master node 302 and a defined number of Spark worker nodes 304). After the Java™ program completes execution of the Spark master node 302 (with the data having been collected and written into intermediate data files), the Spark cluster 300 may be scaled as necessary to execute the remainder of the Spark job (such as reconciling and merging the data in the intermediate data files and writing the merged data to the destination database).

Figure 4:
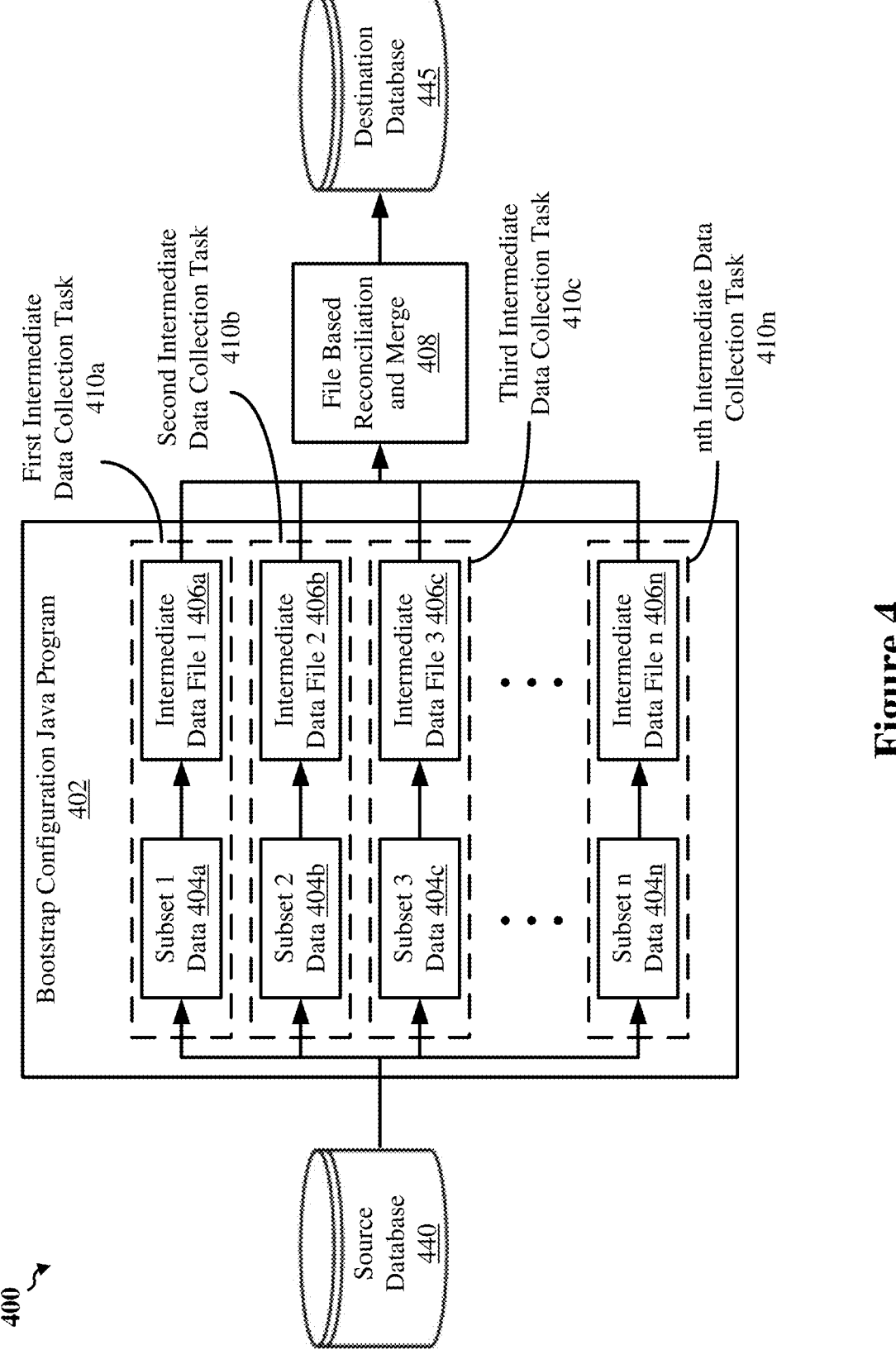
FIG. 4 shows an example bootstrap configuration process for fully bootstrapping a destination database, according to some implementations.

FIG. 4 shows an example bootstrap configuration process 400 for fully bootstrapping a destination database 445, according to some implementations. The source database 440 is an example implementation of the source database 140 in FIG. 1, and the destination database 445 is an example implementation of the destination database 145 in FIG. 1. The process 400 includes execution of the bootstrap configuration Java™ program 402, which includes execution of the intermediate data collection tasks 410a-410n for collecting the plurality of subsets of data 404a-404n from the source database 440 to generate the plurality of intermediate data files 406a-406n. Process 400 is described below as being performed by the system 100 in FIG. 1, and in particular the Spark cluster 300 in FIG. 3 allocated to execute the Spark job, for clarity.

Subset 1 data 404a is the data collected from execution of the first intermediate data collection task 410a, subset 2 data 404b is the data collected from execution of the second intermediate data collection task 410b, subset 3 data 404c is the data collected from execution of the third intermediate data collection task 410c, and so on up to the subset n data 404n being the data collected from execution of the nth intermediate data collection task 410n. Execution of the first intermediate data collection task 410a causes the subset 1 data 404a to be pulled from the source database 440 (such as executing the plurality of JDBC™ data pulls based on the data table locations gathered to generate the intermediate data collection task) and written to a temporary storage (the intermediate data file 1 406a) before being written to the destination database 445. Execution of the second intermediate data 410b collection task causes the subset 2 data 404b to be pulled from the source database 440 and written to the temporary storage (the intermediate data file 2 406b) before being written to the destination database 445. Execution of the third intermediate data collection task 410c causes the subset 3 data 404c to be pulled from the source database 440 and written to the temporary storage (the intermediate data file 3 406c) before being written to the destination database 445. Similar execution of the intermediate data collection tasks may occur up to the execution of the nth intermediate data collection task 410n that causes the subset n data 404n to be pulled from the source database 440 and written to the temporary storage (the intermediate data file n 406n) before being written to the destination database 445. While the intermediate data collection tasks 410a-410n are depicted as being part of a single Java™ program 402 for clarity, in some other implementations, the intermediate data collection tasks may be distributed across a plurality of bootstrap configuration Java programs. Either way, the one or more bootstrap configuration Java programs may be executed on the Spark master node of the Spark cluster to process the Spark job.

The intermediate data files 406a-406n temporarily store the pulled data for the corresponding intermediate data collection task 410a-410n. For example, the task execution engine 155 in FIG. 1 may populate a directory in a storage (such as database 120) with a data file for each of the intermediate data collection tasks. The task execution engine 155 may also generate indicators in the directory as to whether each of the intermediate data collection tasks completes successfully. In some implementations, an indicator to indicate that an intermediate data collection task was successfully completed is a dummy file with a formatted name indicating the specific subset of data is successfully pulled and written to the intermediate data file. For example, the Spark master node 302 of the Spark cluster 300 in FIG. 3 allocated to execute the Spark job for the full bootstrap may execute the bootstrap configuration Java™ program 402. The Spark master node 302 thus generates the intermediate data file for each intermediate data collection task with the pulled data for that task and generates the indicator (such as a dummy file having a defined name and stored in a defined location of a directory) once the data pull for the intermediate data collection task is completed.

In some implementations of having to again execute an intermediate data collection task based on an error generated during execution of the intermediate data collection task, the Java™ program 402 is configured for error handling during data pull. To note, instead of having to purge all previously collected data pulled from the source database 440 and start the Spark job from the beginning, the intermediate data files 406a-406n still exist. Additionally, for each intermediate data collection task 410a-410n that previously completed, the directory to indicate completion of the data pulls includes an indicator that the task completed. As such, instead of starting the data pull from the beginning (thus deleting all previously pulled data), the Spark master node 302 continues to execute the Java program 402, which is configured to cause a scan of the indicators in the directory to identify which intermediate data collection tasks 410a-410n did not complete. Since an intermediate data collection task that causes an error may not complete, the Spark master node 302 does not generate the indicator in the directory for that incomplete intermediate data collection task. As such, the Spark master node 302, in executing the Java program 402, may delete any partially generated intermediate data file for that intermediate data collection task and again execute that intermediate data collection task. Since the Spark job is not again executed, the Spark cluster 300 is not scaled with additional resources, thus destroying all previous work performed and thus delaying completion of the bootstrap.

Based on all of the intermediate data files 406a-406n being complete (with all of the intermediate data collection tasks 410a-410n being executed successfully), execution of the Java™ program 402 may cause the Spark master node 302 to generate an overall success indicator in the directory to indicate that the data pulls successfully completed across all intermediate data collection tasks 410a-410n. Based on the overall success indicator being generator, the remainder of the Spark job may be executed. In particular, the allocated Spark cluster 300 is to perform a file based reconciliation and merge process 408 of the intermediate data files 406a-406n to prepare the collected data for writing to the destination database 445 (and thus the completion of the Spark job). In some implementations, if the division of data objects for the intermediate data collection tasks is based on a modulo function, the system 100 may interleave the data objects in the intermediate data files 406a-406n during the reconciliation and merge process 408 so that the original order of the data objects is preserved when writing the data objects to the destination database 445.

Referring back to FIG. 1, the ingestion adapter 160 includes one or more interface adapters for ingesting data from the source database 140, formatting the data, and providing the data to the event bus 170. In some implementations, the ingestion adapter 160 includes the Apache Kafka™ Connect component of Apache Kafka, which ingests and integrates data from different data sources. In some implementations, the ingestion adapter 160 may include Oracle™ GoldenGate for ingesting data from different data sources. The ingestion adapter 160 may ingest the data objects for the JDBC™ data pull operations, with the data objects written to the intermediate data files as described above.

In many instances, the destination database 145 is to have its data synchronized with the source database 140. For example, the data in one or more online transaction processing (OLTP) databases is to be synchronized to one or more online analytical processing (OLAP) databases. As such, changes in the source database 140 (such as one or more OLTP databases) are to be received and used to synchronize the data in the destination database 145 (such as one or more OLAP databases). The changes are indicated by the source database 140 in change data capture (CDC) events. For example, each time a change in a data object or an addition of a data object occurs at the source database 140, a CDC event is triggered at the source database 140. A CDC event may capture the changes in the source database 140, which is serialized into a format that includes information about the associated change, such as a timestamp of and the data before and after the change. The format of the CDC event may be any suitable format ingestible by the ingestion adapter 160. In addition to CDC events that identifies changes to the data, any other changes in the domain state for the source database 140 may be triggered as domain events. For example, a domain event may be triggered based on a user logging into a service or website for which the source database 140 stores data or otherwise assists. A domain event may be in a defined format for input directly into the event bus 170.

The event bus 170 includes one or more buses to receive the formatted data object from the ingestion adapter 160 based on the CDC events and the domain events from the source domain, and the event bus 170 may provide the data and events to one or more components for synchronizing data or to cause other operations to be performed. For example, an OLAP database may be updated based on data from CDC events received at the event bus 170 from an OLTP database (via the ingestion adapter 160). The database (DB) writer 180 receives CDC event based data from the event bus 170 and writes data in a raw form to a data object storage, with the data processed in the storage and written to the destination database 145 via a materialization engine (materializer). As used herein, a materialization process performed by a materializer refers to the replication of data or information from the source database 140 (such as from one or more OLTP databases or other domain sources) to the destination database 145 (such as to one or more OLAP databases).

The batch materialization engine 185 (batch materializer) processes batches of data objects from the event bus and stored in the data object storage and writes the processed data objects to the destination database 145. As such, the DB writer 180 processes a batch of data from the event bus 526 and places the batch of data in the data object storage, with the batch materializer 185 processing the batch of data to synchronize the destination database 145 to include the batch of data objects. In synchronizing the destination database 145, one or more index tables to index the data in the destination database 145 (such as one or more Apache Hive™ tables in the Apache Parquet™ file format) may be generated or updated based on the changes to the data in the destination database 145. To note, while batch materialization is scalable and may be cost effective for larger materialization processes since not time critical, batch materialization may not be close to real-time.

The streaming materialization engine 190 (streaming materializer) is to perform the materialization process in near real-time (referred to simply herein as real-time), with the streaming materializer 190 to retrieve events from the event bus 170 and write the data in the event to a specific destination in the destination database 145. To ensure data integrity and to allow quick access to the data soon after writing to the destination database 145, one or more delta tables may be updated, with the delta tables indexing the data provided by the streaming materializer 190 and now stored at the destination database 145.

The components 160-190 of system 100 in FIG. 1 may be part of a unified ingestion platform (UIP). The UIP may be configured to ingest data from a plurality of different data sources and manage and synchronize the data into a data destination. As described herein, the UIP ingests data from the source database 140 (which may include a plurality of different data sources) and manages and synchronizes the data to the destination database 145 (which may include a data lake or another suitable data storage and management system). In some implementations, the materialization process for a UIP may be between one or more OLTP databases and one or more OLAP databases. As such, fully bootstrapping the destination database may refer to bootstrapping an OLAP database from one or more OLTP databases. For example, a data lake to store the data from the OLTP databases (and domain event data, in some implementations) for the source domain may be bootstrapped by the system 100 using the processes described herein.

FIG. 5 shows an example UIP 500 for one or more OLTP databases and one or more OLAP databases, according to some implementations. To note, while the OLAP database is not depicted in FIG. 5, the tables 534 and 538 depict the index tables that may index the data in the OLAP database. The OLTP database 502 is an example implementation of the source database 140 of system 100 in FIG. 1, the ingestion adapter 518 is an example implementation of the ingestion adapter 160 of system 100 in FIG. 1, the event bus 526 (EventBus) is an example implementation of the event bus 170 of system 100 in FIG. 1, the DB writer 528 is an example implementation of the DB writer 180 of system 100 in FIG. 1, the batch materializer 532 is an example implementation of the batch materializer 185 of system 100 in FIG. 1, and the streaming materializer 536 is an example implementation of the streaming materializer 190 of system 100 in FIG. 1. In some implementations, the UIP is implemented using the Amazon® Web Services (AWS) cloud computing environment.

As depicted, the OLTP database 502 may include a plurality of data sources, such as a MySQL™ database 504, an Oracle™ database 506, a PostgreSQL™ (Postgres) database 508, an SQL database 510, and an Amazon™ DynamoDB 512. To note, "database" used in the referred examples may refer to any suitable storage, which may include a single storage location or a distributed storage system (such as a cloud based storage solution, which may include many of the databases 504-512). To ensure synchronization between the OLTP data sources and the OLAP database (such as a data lake), CDC events 514 from the OLTP database 502 (such as from one or more of the data sources 504-512) are ingested by the ingestion adapter 518, formatted, and provided as formatted data objects 524 to the event bus 526. For example, a CDC event 514 from the Oracle database 506 or from the other databases may be ingested by the Oracle™ GoldenGate adapter 520, which formats the CDC event 514 into the formatted data object 524 and provided to the event bus 526. In another example, a CDC event 514 from a data source may be ingested by the Apache Kafka™ Connect adapter 522, which formats the data object 524 before providing the formatted data object 524 to the event bus 526. The ingestion adapter 518 is configured to format the data objects 524 into a specific format as defined for the UIP 500 (referred to herein as a "UIP format").

As noted above, domain events 516 may also be received by the event bus 526 from the data source domain (depicted as coming from the OLTP database 502 in FIG. 5). For example, domain events 516 may be received by the event bus 526 from an intrusion prevention system (IPS) for the data source domain. The IPS triggers a domain event 516 when an intrusion behavior or attack is detected, such as trojan horses, worms, or spyware attempting to be loaded into the data source domain. In another example, domain events 516 may be received by the event bus 526 from an outbox service. The outbox service may store and transmit messages regarding the transactions that occur at a data source domain (such as changes to the data or interactions that occur within the data source domain). Otherwise, domain events 516 may be received by the event bus 526 from the data source domain for any other domain changes that trigger a domain event 516. In some implementations, a domain event 516 is in the Event-Carried State Transfer (ECST) format for a distributed system, such as the OLTP database 502.

The event bus 526 may act as a temporary storage of data objects 524 and domain events 516 as received from the data source. In the example UIP 500, CDC events 514 may be processed in batches by the batch materializer 532, and domain events 516 may be processed in near real-time by the streaming materializer 536. For example, routine changes in data objects may not require immediate attention, and as such, batch processing of the CDC event based data objects may be an efficient use of resources. In contrast, domain events 516 (such as from the IPS based on an attack on a data source) may be time sensitive, and as such, may require real-time processing. As such, for batch processing, the DB writer 528 may read a batch of the data objects 524 in the UIP format based on the CDC events 514 from the event bus 526. For real-time processing, the streaming materializer 536 may read the domain events 516 in the ECST format from the event bus 526 as they are received. In some implementations, real-time users 540 (such as a user device) may have direct access to the event bus 526. In this manner, a user may be alerted in real-time of a domain event 516.

Referring to the batch processing of the formatted data objects 524, the DB writer 528 receives a batch of data objects 524 from the event bus 526, processes the batch of data objects 524, and writes the batch of data objects 524 to the data object storage 530. In some implementations, the data object storage 530 is the Amazon™ Simple Storage Service (S3) of AWS™, and the DB writer 528 is the S3 writer for writing data to S3. As such, the S3 writer (as the DB writer 528) writes the batch of processed data objects from the event bus 526 to an S3 location (such as one or more S3 buckets).

The batch materialization engine 532 reads the processed data objects from the data object storage 530 (such as from the one or more S3 buckets), processes the data objects, and writes the data objects to the destination database (such as a data lake). With the data objects stored in the data lake, the Apache Hive™ tables 534 indexing the data in the data lake are generated or updated to index the new or updated data in the data lake.

Referring to the real-time processing of the domain events 516, the streaming materializer 536 transfers the domain event data from the event bus 526 to a defined destination in the destination database (such as a specific location in the data lake or in a separate data lake). The delta tables 538 indexing the changes in the data lake based on the streaming materialization are generated or updated to index the changes in the data lake.

With reference to the UIP 500 in FIG. 5, full bootstrapping of a destination database may refer to the initialization or reconstruction of a portion of the data lake or the data lake itself so that the data lake is synchronized with the OLTP database 502 (and thus stores all of the data of the OLTP database 502). As such, the processes and system described herein may be implemented for the full bootstrapping of a destination database for the UIP 500. However, the processes and system described herein may also be implemented for the full bootstrapping of any suitable destination database 145 based on a source database 140.

Figure 6:
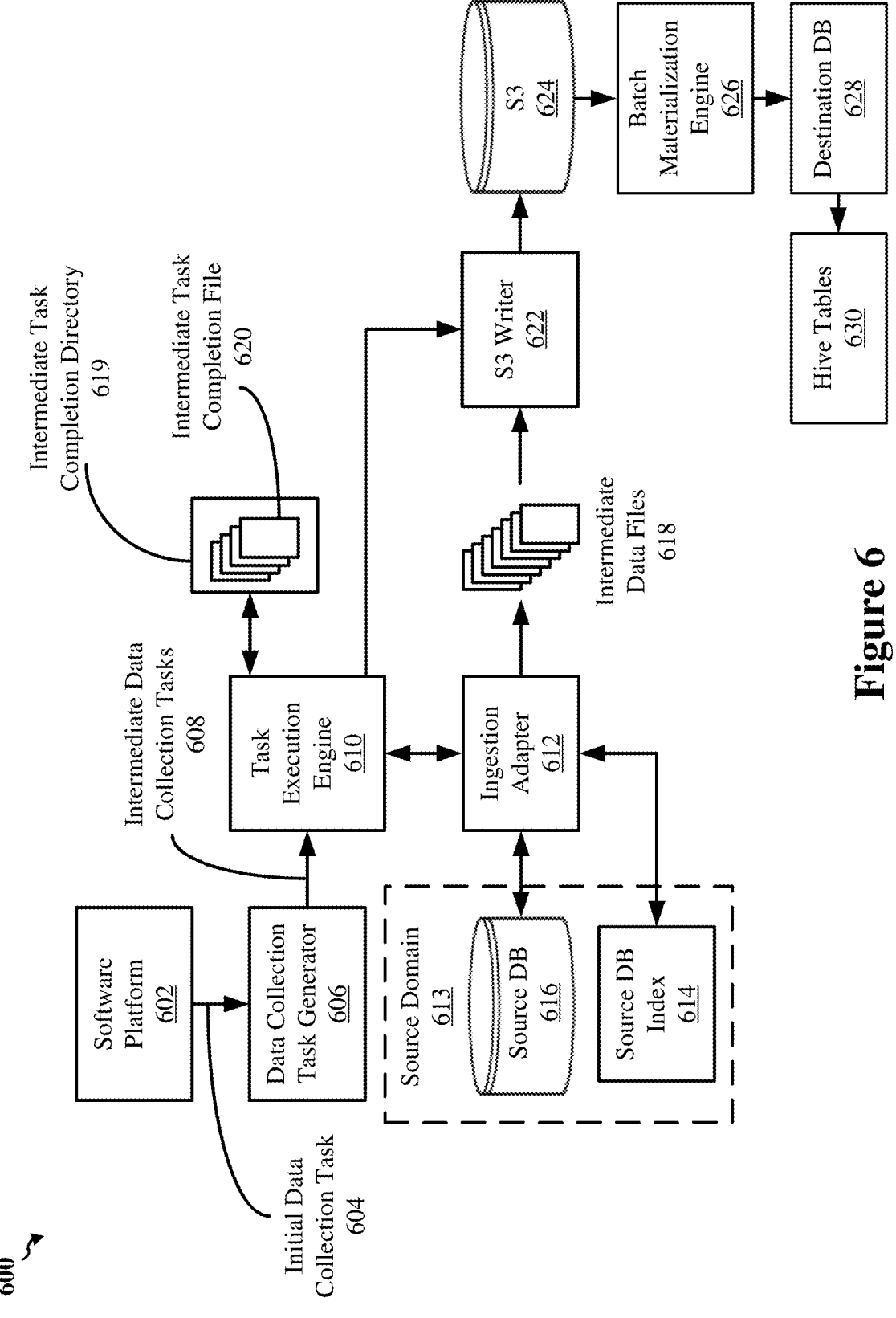
FIG. 6 shows an example block diagram for bootstrapping a destination database based on a source database, according to some implementations.

FIG. 6 shows an example block diagram 600 for bootstrapping a destination database 628 based on a source database 616, according to some implementations. The block diagram 600 is described with reference to system 100 in FIG. 1, and in particular UIP 500 in FIG. 5. FIG. 7 shows an illustrative flow chart of an example operation 700 of bootstrapping a destination database, according to some implementations. FIG. 6 and FIG. 7 are described below concurrently, with components of the system 100 (and in particular of the UIP 500) performing operation 700 and as depicted in the block diagram 600.

Referring to the example operation 700, at 702, the system 100 receives an initial data collection task of a software platform to retrieve data from one or more source databases. For example, the software platform 602 may execute on the system 100 and produce an initial data collection task 604 to fully bootstrap a destination database 628 based on the source database 616. Alternatively, the system 100 may receive the initial data collection task 604 from a remote software platform 602 (such as from a device outside of the AWS™ environment in which the UIP 500 may be implemented).

The initial data collection task includes a plurality of identifiers to identify the data to be collected from the one or more source databases (704). For example, the initial data collection task may identify one or more data sources to which the destination database 628 is to synchronize. In this manner, all identifiers included in the data sources are to be used for collecting the data from the data sources. Additionally, the initial data collection task may include specific identifiers, a range of identifiers, or other indications of identifiers to identify the data to be collected from the one or more source databases.

At 706, the system 100 (such as the data collection task generator 150) divides the initial data collection task into a plurality of intermediate data collection tasks. For example, the initial data collection task 604 may be included in a single Spark job from the software platform 602. The data collection task generator 606 may identify from the initial data collection task 604 the data sources and the identifiers to be used to divide the initial data collection task into the plurality of intermediate data collection tasks. Each identifier identifies a data object to be written to the destination database 628. In some implementations, each identifier is a primary key corresponding to a data object to be written to the destination database 628. In some other implementations, each identifier is a data table value (table value) associated with the data identified by the identifier and stored in a table column, with the table column having a high cardinality.

The data collection task generator 150 divides the data to be collected into a plurality of subsets of data based on the plurality of identifiers (708). The data collection task generator 150 generates the plurality of intermediate data collection tasks, with each intermediate data collection task corresponding to a subset of data from the plurality of subsets of data to be collected. As such, each intermediate data collection task instructs pulling a subset of the plurality of subsets of data from the one or more source databases (710).

In some implementations of dividing the data into the plurality of subsets of data based on the plurality of identifiers, the system 100 (such as the data collection task generator 150) may, for each identifier of the plurality of identifiers, perform a modulo function on the identifier based on a defined divisor to generate a remainder and group the data into the plurality of subsets of data based on a same remainder. For example, if the identifier is a primary key, the data collection task generator 606 may instruct the SQL queries 200 to be applied to the primary keys in the source database index 614 to generate the remainders and write the primary keys to different groups in the Big Table based on a same remainder. If the identifier is a cell value from a data table column having a high cardinality, the data collection task generator 606 may instruct SQL queries similar to queries 200 to be applied to the cell values (or hashes of the cell values if more than one column is to be used or if the cell values may include non-numerical values) in the data tables of the source database 616 to generate the remainders and write the data table locations of the identifiers to different groups in the Big Table based on a same remainder. To note, FIG. 6 depicts the source database index 614 as separate from the source database 616 for the source domain 613 exclusively for clarity, as the index tables may be stored in the source database 616.

With the identifiers (or data table locations) divided into a plurality of subsets corresponding to the plurality of subsets of data to be collected, the data collection task generator 606 generates an intermediate data collection task 608 for each subset. As noted above, one or more intermediate data collection tasks may be a Java™ program to instruct execution of JDBC™ pull operations, with the data table location being inserted as a parameter in the pull operation. As such, the initial data collection task 604 may be an Apache Spark™ job, and each intermediate data collection task of the plurality of intermediate data collection tasks 608 may be a JDBC script of a Java program.

At 712, the system 100 (such as the task execution engine 155) executes each intermediate data collection task from the plurality of data collection tasks. To execute an intermediate data collection task 608, the task execution engine 610 instructs pulling the subset of data associated with the intermediate data collection task 608 from the one or more source databases, such as the source database 616 (714). For example, the task execution engine 610 may execute the Java™ program to provide the JDBC™ pull operations (from the JDBC script) with the data table locations to be accessed for the intermediate data collection task 608 to the source database 616, with the source database 616 providing the requested data objects to the ingestion adapter 612. The ingestion adapter 612 is an example implementation of the ingestion adapter 518 of the UIP 500 in FIG. 5. If each identifier is a primary key, executing each intermediate data collection tasks may include performing an index search of one or more indexes storing primary keys to find data table locations of the subset of data. In this manner, pulling the subset of data for the intermediate data collection task is based on the index search. For example, the data table locations identified from the index search may be inserted into the JDBC pull operations that are provided to instruct the source database 616 to provide the data objects at the indicated data table locations.

The task execution engine 610 also instructs writing the subset of data pulled in block 714 to an intermediate data file associated with the intermediate data collection task 608 (716). The ingestion adapter 612 may format the data objects and insert the formatted data objects in the corresponding intermediate data file 618 as instructed by the task execution engine 610. After all data is pulled and written to the intermediate data file for the intermediate data collection task 608, the task execution engine 610 may generate an indication that pulling is complete. For example, the task execution engine 610 generates an intermediate task completion file 620 of the intermediate task completion directory 619 to indicate the execution of the intermediate data collection task is completed. In some implementations, the file 620 is a dummy file with a naming format to indicate that execution of the intermediate data collection task successfully completed. After execution of all intermediate data collection tasks 608 successfully completes (such as the task execution engine 610 scanning the directory 619 to identify that all intermediate task completion files 620 are generated for the intermediate data collection tasks 608), the task execution engine 610 may generate a success file indicating the overall success of all data pulls and writing to the intermediate data files 618. In some implementations, the success file is also a dummy file of a naming format to indicate the overall success of all data pulls. In this manner, based on the success file being generated, the system 100 may proceed with reconciling and merging the data in the intermediate data files 618 for writing to the destination database 628.

To note, intermediate data collection tasks may be executed in sequence or concurrently. In some implementations, executing each intermediate data collection task from the plurality of data collection tasks includes concurrently executing two or more of the plurality of data collection tasks. As such, two or more subsets of data from a plurality of the one or more source databases may be pulled concurrently. Additionally or alternatively, an intermediate data collection task may include a plurality of threads. As such, in some implementations, multiple data pulls for an intermediate data collection task may be performed concurrently.

If an error is generated before one or more of the intermediate data collection tasks 608 complete, the task execution engine 610 identifies which intermediate data collection tasks 608 did not complete based on the intermediate task completion directory 619 and which intermediate task completion files 620 are not generated. The task execution engine 610 may thus instruct the one or more intermediate data collection tasks 608 that did not complete to be again executed and the corresponding intermediate data files regenerated. In this manner, if an error is generated in attempting to pull a first subset of data during execution of a first intermediate data collection task, the system 100 re-executes exclusively the first intermediate data collection task in response to generating the error.

As noted above, if the one or more intermediate data collection tasks 608 are included as JDBC™ scripts of a Java™ program, the Java program may instruct the affected JDBC scripts to be again executed. With the Java program being executed in a Spark master node of a Spark cluster, resources do not need to be reallocated to continue executing the Java program as would be required in repeating execution of a single Spark job for the bootstrap process.

At 720, with all intermediate data files 618 generated (such as indicated by a success file in the intermediate task completion directory 619), the system 100 writes the data from the plurality of intermediate data files 618 to a destination database 628. In some implementations, the task execution engine 610 reconciles and merges the data objects from the intermediate data files 618 into an event bus. As noted above, the file based reconciliation and merge process on the intermediate data files 618 may be part of the Apache Spark™ job for which the Spark cluster 300 may be utilized. With the intermediate data collection tasks being exclusively executed at the Spark master node 302, in some implementations, the Spark cluster 300 for the Spark job may be scaled after completing execution of the plurality of intermediate data collection tasks (and before the Spark cluster 300 is to perform the file based data reconciliation and merging process for writing the merged data to the destination database 628).

The system 100 may place the reconciled and merged data into the event bus 170, with the S3 writer 622 writing the merged data to the S3 624 and the batch materializer 626 batch processing and writing the data from the S3 624 to the destination database 628. The S3 writer 622 is an example implementation of the DB writer 528 of the UIP 500, the S3 624 is an example implementation of the data object storage 530 of the UIP 500, and the destination database 628 is an example implementation of the destination database 145. In some implementations, the destination database 628 may be a data lake to synchronize to the source database. As noted above, in some implementations, the source database 616 includes one or more OLTP databases, and the destination database 628 includes an OLAP database.

With the data written to the destination database 628, the system 100 may populate an Apache Hive™ table to point to the data written to the destination database 628. In this manner, the data in the destination database 628 is indexed by one or more index tables.

As described herein, a computing system performs a full bootstrap of a destination database by dividing the data pull operations that can cause errors during a single Spark job into a plurality of intermediate data collection tasks to pull subsets of the data. As a result, the system is able to handle errors by re-executing only the affected intermediate data collection task without impacting the other intermediate data collection tasks. In addition, the intermediate data collection tasks being included in one or more Java™ programs (such as including JDBC™ scripts) allows the system (which may include the Spark master node) executing the Java program to handle the error without requiring restarting the entire job (which would require scaling the Apache™ cluster if a Spark job is restarted). As such, described herein is a system and process for performing a resource efficient full bootstrap of a destination database.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c. In addition, the term "document" may be used interchangeably with "electronic document" or "computer readable document" based on how used above.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer readable medium. The processes of a method or algorithm disclosed herein may be implemented in a processor-executable software module which may reside on a computer readable medium. Computer readable media includes both computer storage media and communication media including any medium that can be enabled to transfer a computer program from one place to another. A storage media may be any available media that may be accessed by a computer. By way of example, and not limitation, such computer readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer readable media. Additionally, the operations of a method or algorithm may reside as one or any combination or set of codes and instructions on a machine readable medium and computer readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while a modulo function is described as an example implementation of the mathematical operator, other implementations of a mathematical operator may include binning based on defined ranges of the identifiers, dividing the identifiers based on the least significant digit of the identifier when in base 10 number format, and so on. While the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for bootstrapping a destination database, the method comprising:

receiving an initial data collection task of a software platform to retrieve data from one or more source databases in which the data is arranged in an original order, wherein the initial data collection task includes a plurality of identifiers to identify the data to be collected from the one or more source databases;

dividing the initial data collection task into a plurality of intermediate data collection tasks, including dividing the data into a plurality of subsets of data based on the plurality of identifiers, wherein each intermediate data collection task instructs pulling a subset of the plurality of subsets of data from the one or more source databases;

executing each intermediate data collection task from the plurality of intermediate data collection tasks, wherein the execution of each respective intermediate data collection task includes:

pulling the subset of data associated with the respective intermediate data collection task from the one or more source databases;

writing the subset of data to an intermediate data file associated with the respective intermediate data collection task; and generating an indication that pulling is complete for the respective intermediate data collection task after writing the subset of data to the intermediate data file; and after writing all of the data to the plurality of intermediate data files for the plurality of intermediate data collection tasks, writing the data from the plurality of intermediate data files to a destination database, wherein the original order of the data is preserved in the destination database.

2. The method of claim 1, wherein dividing the data into the plurality of subsets of data based on the plurality of identifiers includes:

for each identifier of the plurality of identifiers, performing a modulo function on the identifier based on a defined divisor to generate a remainder; and grouping the data into the plurality of subsets of data based on a same remainder.

3. The method of claim 1, wherein each identifier of the plurality of identifiers is one of:

a primary key; or a table value associated with the data identified by the identifier and stored in a table column, wherein the table column has a high cardinality.

4. The method of claim 3, wherein executing each intermediate data collection task with each identifier being a primary key includes performing an index search of one or more indexes storing primary keys to find data table locations of the subset of data, wherein pulling the subset of data is based on the index search.

5. The method of claim 1, wherein executing each intermediate data collection task from the plurality of data collection tasks includes concurrently executing two or more of the plurality of data collection tasks, including pulling two or more subsets of data from a plurality of the one or more source databases concurrently.

6. The method of claim 1, further comprising:

generating an error in attempting to pull a first subset of data during execution of a first intermediate data collection task; and re-executing exclusively the first intermediate data collection task in response to generating the error.

7. The method of claim 1, wherein:

the initial data collection task is an Apache Spark job; and each intermediate data collection task of the plurality of intermediate data collection tasks is a Java Database Connectivity (JDBC) script.

8. The method of claim 7, further comprising scaling an Apache Spark cluster for the Apache Spark job after completing execution of the plurality of intermediate data collection tasks.

9. The method of claim 7, further comprising populating an Apache Hive table to point to the data written to the destination database, wherein writing the data from the plurality of intermediate data files to the destination database includes writing the data to an Amazon Special Storage Service (S3) location.

10. The method of claim 1, wherein:

the one or more source databases include one or more online transaction processing (OLTP) databases; and the destination database includes an online analytical processing (OLAP) database.

11. The method of claim 1, wherein generating an indication that pulling is complete comprises:

generating an intermediate task completion file in a directory after writing the subset of data objects to the intermediate data file, wherein the intermediate task completion file indicates that pulling is complete for the respective intermediate data collection task.

12. The method of claim 11, further comprising:

after writing all of the data to the plurality of intermediate data files for the plurality of intermediate data collection tasks, determining that pulling is complete for all of the intermediate data collection tasks based on the intermediate task completion file in the directory, wherein the writing of the data from the plurality of intermediate data files to the destination database is based on determining that pulling is complete for all of the intermediate data collection tasks.

13. The method of claim 1, wherein writing the subset of data to the intermediate data file includes:

interleaving the subset of data in the intermediate data file, wherein the original order of the data is preserved in the destination database based on the interleaving.

14. A computing system for bootstrapping a destination database, the system comprising:

one or more processors; and a memory storing instructions that, when executed by the one or more processors, causes the system to perform operations comprising:

receiving an initial data collection task of a software platform to retrieve data from one or more source databases in which the data is arranged in an original order, wherein the initial data collection task includes a plurality of identifiers to identify the data to be collected from the one or more source databases;

dividing the initial data collection task into a plurality of intermediate data collection tasks, including dividing the data into a plurality of subsets of data based on the plurality of identifiers, wherein each intermediate data collection task instructs pulling a subset of the plurality of subsets of data from the one or more source databases;

executing each intermediate data collection task from the plurality of intermediate data collection tasks, wherein the execution of each respective intermediate data collection task includes:

pulling the subset of data associated with the respective intermediate data collection task from the one or more source databases;

writing the subset of data to an intermediate data file associated with the respective intermediate data collection task; and generating an indication that pulling is complete for the respective intermediate data collection task after writing the subset of data to the intermediate data file; and after writing all of the data to the plurality of intermediate data files for the plurality of intermediate data collection tasks, writing the data from the plurality of intermediate data files to a destination database, wherein the original order of the data is preserved in the destination database.

15. The system of claim 14, wherein dividing the data into the plurality of subsets of data based on the plurality of identifiers includes:

for each identifier of the plurality of identifiers, performing a modulo function on the identifier based on a defined divisor to generate a remainder; and grouping the data into the plurality of subsets of data based on a same remainder.

16. The system of claim 14, wherein each identifier of the plurality of identifiers is one of a primary or a table value associated with the data identified by the identifier and stored in a table column, wherein the table column has a high cardinality, and wherein executing each intermediate data collection task with each identifier being a primary key includes performing an index search of one or more indexes storing primary keys to find data table locations of the subset of data, wherein pulling the subset of data is based on the index search.

17. The system of claim 14, wherein executing each intermediate data collection task from the plurality of data collection tasks includes concurrently executing two or more of the plurality of data collection tasks, including pulling two or more subsets of data from a plurality of the one or more source databases concurrently.

18. The system of claim 14, wherein the operations further comprise:

generating an error in attempting to pull a first subset of data during execution of a first intermediate data collection task; and re-executing exclusively the first intermediate data collection task in response to generating the error.

19. The system of claim 14, wherein the initial data collection task is an Apache Spark job and each intermediate data collection task of the plurality of intermediate data collection tasks is a Java Database Connectivity (JDBC) script, wherein the operations further comprise:

scaling an Apache Spark cluster for the Apache Spark job after completing execution of the plurality of intermediate data collection tasks; or populating an Apache Hive table to point to the data written to the destination database, wherein writing the data from the plurality of intermediate data files to the destination database includes writing the data to an Amazon Special Storage Service (S3) location.

20. The system of claim 14, wherein:

the one or more source databases include one or more online transaction processing (OLTP) databases; and the destination database includes an online analytical processing (OLAP) database.

\* \* \* \* \*